United States Patent
Takagi et al.

(10) Patent No.: US 8,552,927 B2
(45) Date of Patent: *Oct. 8, 2013

(54) ELECTRONIC DEVICE WITH REFLECTIVE PANEL

(75) Inventors: Hisamitsu Takagi, Kawasaki (JP);
Kazuhiro Kakuguchi, Kawasaki (JP);
Hiroshi Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1134 days.

This patent is subject to a terminal disclaimer.

(21) Appl. No.: 11/723,154

(22) Filed: Mar. 16, 2007

(65) Prior Publication Data
US 2007/0164929 A1 Jul. 19, 2007

Related U.S. Application Data

(62) Division of application No. 10/291,403, filed on Nov. 12, 2002, now Pat. No. 7,307,600.

(30) Foreign Application Priority Data

Apr. 9, 2002 (JP) ................................ 2002-106607

(51) Int. Cl.
*G09G 3/00* (2006.01)
*G09G 3/04* (2006.01)
*G02F 1/1335* (2006.01)
*H04B 1/38* (2006.01)

(52) U.S. Cl.
USPC .............................. 345/32; 349/67; 455/566

(58) Field of Classification Search
USPC .......... 345/32, 84, 1.1–3.1, 169, 211; 349/16, 349/62, 67, 113; 455/566, 575.1
See application file for complete search history.

(56) References Cited

U.S. PATENT DOCUMENTS

| | | |
|---|---|---|
| 3,425,146 A | 2/1969 | Winstanley |
| 3,950,078 A | 4/1976 | Zatsky |
| 4,042,294 A | 8/1977 | Billings, Jr. et al. |
| 4,541,692 A | 9/1985 | Collins et al. |
| 5,436,954 A | 7/1995 | Nishiyama et al. |
| 5,841,431 A | 11/1998 | Simmers |
| 6,246,862 B1 | 6/2001 | Grivas et al. |
| 6,574,487 B1 | 6/2003 | Smith et al. |
| 6,747,609 B2 | 6/2004 | Antila et al. |

(Continued)

FOREIGN PATENT DOCUMENTS

| | | |
|---|---|---|
| EP | 0 932 288 A1 | 7/1999 |
| JP | 5-312970 | 11/1993 |

(Continued)

OTHER PUBLICATIONS

U.S. Appl. No. 11/723,155, filed Mar. 16, 2007, Takagi et al., assignee Fujitsu Limited.

(Continued)

*Primary Examiner* — Srilakshmi K Kumar
(74) *Attorney, Agent, or Firm* — Staas & Halsey LLP

(57) ABSTRACT

An electronic device such as a portable phone has a casing, a display element provided in the casing, and a panel attached to the casing to cover the display element. A half mirror layer and a shading layer are formed on the panel. An opening of the shading layer is above the display element. The surface of the panel is seen in a substantially continuously uniform color when no electricity is supplied to the display element, and a display produced by the display element can be seen through the panel when electricity is supplied to the display element.

3 Claims, 6 Drawing Sheets

(56) References Cited

U.S. PATENT DOCUMENTS

| | | | |
|---|---|---|---|
| 6,792,293 | B1 | 9/2004 | Awan et al. |
| 7,307,600 | B2 | 12/2007 | Takagi et al. |
| 2001/0017674 | A1 | 8/2001 | Yamaguchi |
| 2002/0030755 | A1 | 3/2002 | Uchino |
| 2003/0206279 | A1 | 11/2003 | Kimura et al. |

FOREIGN PATENT DOCUMENTS

| | | |
|---|---|---|
| JP | 2000-196718 | 7/2000 |
| JP | 2001-191858 | 7/2001 |
| JP | 2002-051135 | 2/2002 |
| JP | 2002-071256 | 3/2002 |
| WO | 99/18590 | 4/1999 |

OTHER PUBLICATIONS

Communication from the European Patent Office dated Mar. 10, 2011 in a related European patent application.
Communication from the European Patent Office dated Mar. 15, 2011 in a related European patent application.
Office communication from the USPTO dated Oct. 4, 2010 in the related U.S. Appl. No. 11/723,155.
Office communication from the USPTO dated Apr. 1, 2011 in the related U.S. Appl. No. 11/723,155.
Office Action mailed by the U.S. Patent and Trademark Office on Sep. 12, 2012 in the related U.S. Appl. No. 11/723,155.
Advisory Action mailed by the U.S. Patent and Trademark Office on Aug. 6, 2012 in the related U.S. Appl. No. 11/723,155.
Office Action mailed by the U.S. Patent and Trademark Office on Apr. 4, 2012 in the related U.S. Appl. No. 11/723,155.
Office Action mailed by the U.S. Patent and Trademark Office on Jul. 18, 2011 in the related U.S. Appl. No. 11/723,155.
Office Action mailed by the U.S. Patent and Trademark Office on Oct. 4, 2010 in the related U.S. Appl. No. 11/723,155.
Office Action mailed by the U.S. Patent and Trademark Office on Apr. 1, 2010 in the related U.S. Appl. No. 11/723,155.
Office Action mailed by the U.S. Patent and Trademark Office on Jan. 18, 2013 in the related U.S. Appl. No. 11/723,155.
Communication from the European Patent Office dated Nov. 19, 2009 in the related European patent application No. 02 25 7908.
Office communication from the USPTO dated Oct. 6, 2004 in the related U.S. Appl. No. 10/291,403.
Office communication from the USPTO dated Jun. 14, 2005 in the related U.S. Appl. No. 10/291,403.
Office communication from the USPTO dated Oct. 4, 2005 in the related U.S. Appl. No. 10/291,403.
Office communication from the USPTO dated Dec. 14, 2005 in the related U.S. Appl. No. 10/291,403.
Office communication from the USPTO dated Jun. 29, 2006 in the related U.S. Appl. No. 10/291,403.
Notice of Allowance from the USPTO dated May 4, 2007 in the related U.S. Appl. No. 10/291,403.
Notice of Allowance from the USPTO dated Sep. 21, 2007 in the related U.S. Appl. No. 10/291,403.

ELECTRONIC DEVICE WITH REFLECTIVE PANEL

This application is a divisional of U.S. patent application Ser. No. 10/291,403, filed Nov. 12, 2002 now U.S. Pat. No. 7,307,600. This application is based upon and claims priority from Japanese application no. 2002-106607 filed Apr. 9, 2002, the contents being incorporated herein by reference.

BACKGROUND OF THE INVENTION

1. Field of the Invention

The present invention relates to an electronic device having a display part.

2. Description of the Related Art

An electronic device, for example, a portable phone, has a display part and push buttons. There is a portable phone having a first display part and a second display part. For Example, the first display part comprising a liquid crystal display device or the like is provided on one side of the casing of the portable phone, and the second display part comprising an organic EL (electroluminescence), an LED or a liquid crystal display device is provided on the other side of the casing. For a foldable portable phone, the first display part is provided on the inner side of the casing and the second display part is provided on the outer side of the casing, that is, on a surface opposite to a surface on which switch keys are provided. In this case, the second display part can be seen with the portable phone in folded condition.

As a prior art using an organic EL for example, Japanese Unexamined Patent Publication (Kohyo) No. 2001-519585 discloses an example in which an EL is provided on the casing of the portable phone. Japanese Unexamined Patent Publication (Kokai) No. 5-312970 discloses a time piece having a luminous dial using a half mirror and an organic EL. EL stands for an electroluminescence.

The portable phone is carried by its user, so the feature of an outward looking is important, and, it is important for a portable phone to have an interesting appearance and to make its user feel an attachment to the portable phone. Therefore, it is preferable for the display part, which is provided on the outer surface of the portable phone, to have an outstanding design and features which appeal to its user.

SUMMARY OF THE INVENTION

The object of the present invention is to provide an electronic device having a unique feature in appearance.

An electronic device according to the present invention comprises a casing, a display element provided into the casing, and a panel attached to the casing to cover the display element, wherein the arrangement is such that the surface of the panel can be seen in a substantially continuously uniform color when no electricity is supplied to the display element, a display produced by the display element can be seen through the panel when electricity is supplied to the display element.

In this structure, when the display element is not used, the panel surface which is located on the outer surface side of the electronic device exhibits a substantially continuously uniform color as if the display part does not exist. On the other hand, when the display element is used, it seems that a display appears suddenly on the panel surface on which nothing had existed. Therefore, when a display appears on the panel surface, a user is given a deeper impression and surprises for the sudden indication. This display is outstanding in its design, or has appealing features for its user in a point that a display suddenly appears in an empty area. Because a boundary line outlining a display area of the display is not visible, and only the display can be seen, the above mentioned effect remarkably stands out.

BRIEF DESCRIPTION OF THE DRAWINGS

The present invention will become more apparent from the following description of the preferred embodiments, with referring to the accompanying drawings, in which.

DESCRIPTION OF THE PREFERRED EMBODIMENTS

Figure 1:
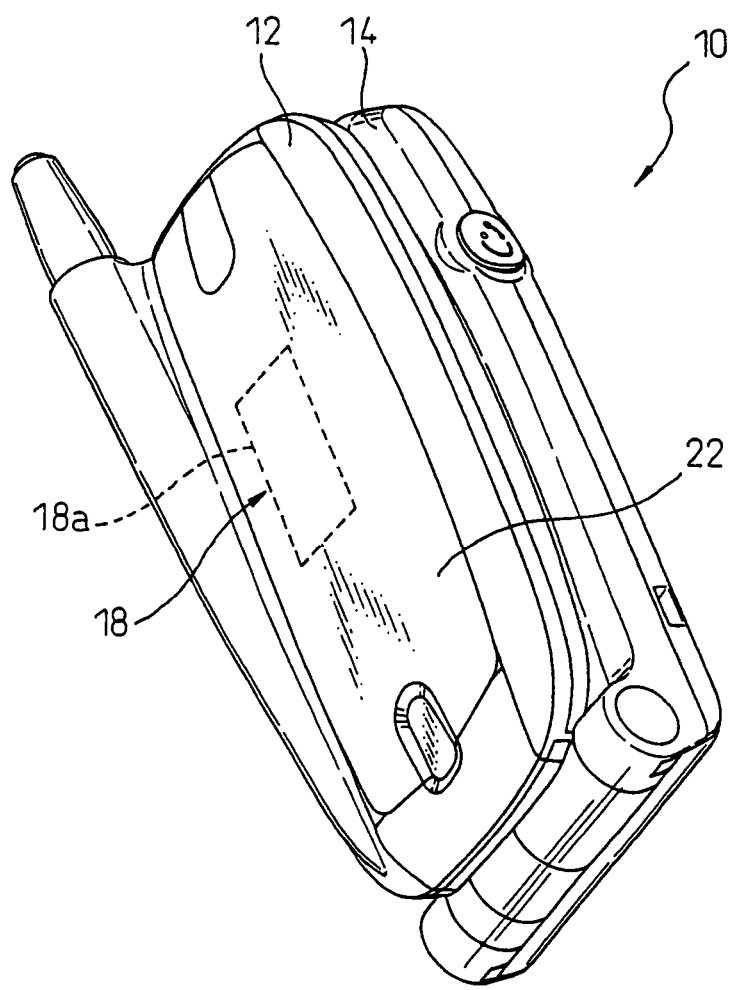
FIG. 1 is a perspective view showing a portable phone of an embodiment of the present invention.
Figure 2:
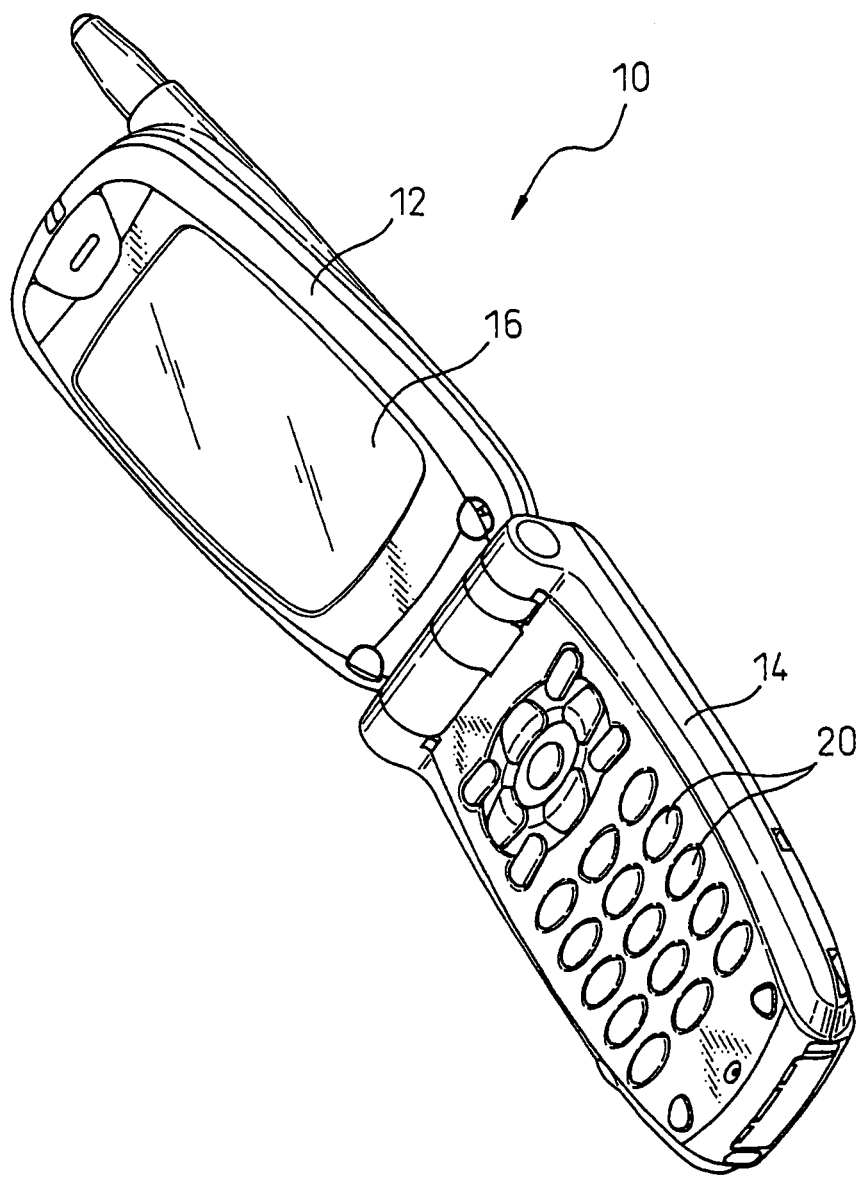
FIG. 2 is a perspective view showing the portable phone of FIG. 1 in the opened condition.
Figure 3:
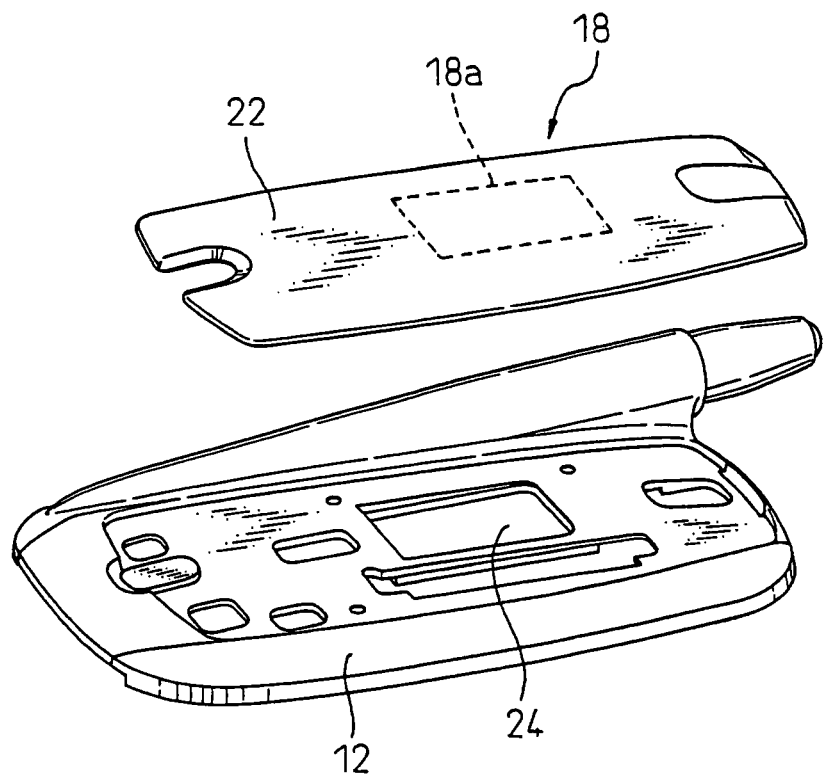
FIG. 3 is a perspective view of the first casing and the panel of the portable phone of FIGS. 1 and 2.

Embodiments of the present invention will be explained below with reference to the attached drawings. FIG. 1 is a perspective view of a foldable portable phone according to an embodiment of the present invention. FIG. 2 is a perspective view of the portable phone of FIG. 1 in an opened state. FIG. 3 is a perspective view of the first casing and the panel of the portable phone of FIGS. 1 and 2.

The portable phone 10 shown in FIGS. 1 to 3 as an example of an electronic device is a foldable portable phone comprising a first casing 12 and a second casing 14 pivotally coupled to each other. The first casing 12 has a display part 16 on its inner side and a second display part 18 on its outer side. The second casing 14 has push buttons 20 and other operation means. In the embodiment, the first display part 16 includes a liquid crystal display device, and the second display part 18 includes an organic EL (electroluminescence).

As shown in FIGS. 1 and 3, the first casing 12 includes a panel 22. The second display part 18 includes an EL (EL module) 24, which is provided in the first casing 12, and the panel 22 is attached to the outer surface side of the first casing 12 so as to cover the EL 24. The surface of the panel 22 is seen in a substantially continuously uniform color, and the second display part 18 is not normally seen, so it is represented by a broken line in FIG. 1. The second display 18 part has a display area 18a, but the border line which defines the display area 18a is not normally seen.

Figure 4:
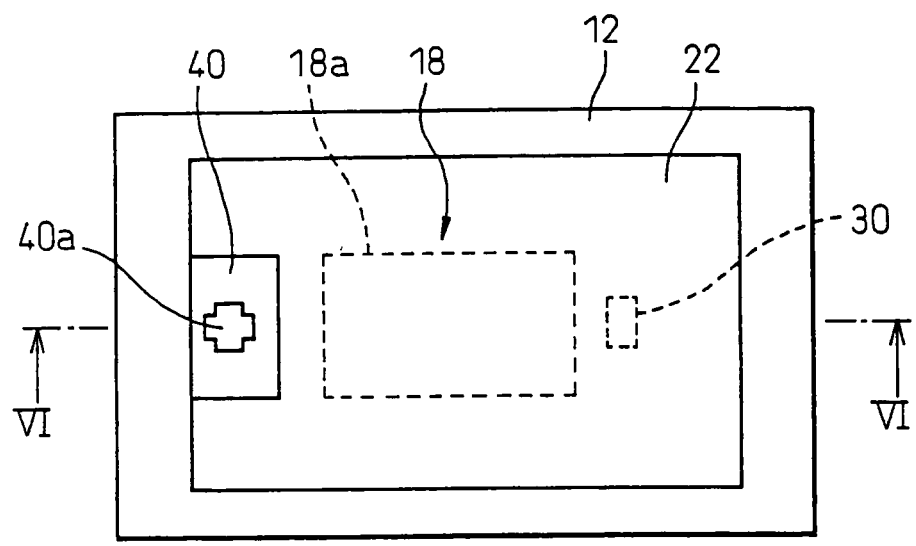
FIG. 4 is a plan view schematically showing the first casing of FIGS. 1 to 3.
Figure 5:
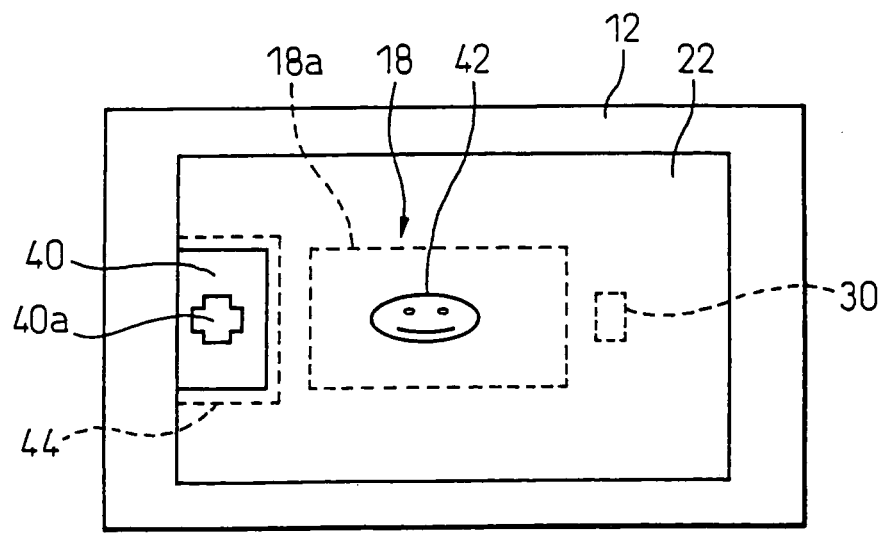
FIG. 5 is a plan view schematically showing the first casing when the EL is energized.

FIG. 4 is a plan view schematically showing the first casing 12 of FIGS. 1 to 3. FIG. 4 shows the first casing 12 when electricity is not supplied to the EL 24. FIG. 5 is a plan view schematically showing the first casing 12 of FIG. 4 when electricity is supplied to the EL 24.

Figure 6:
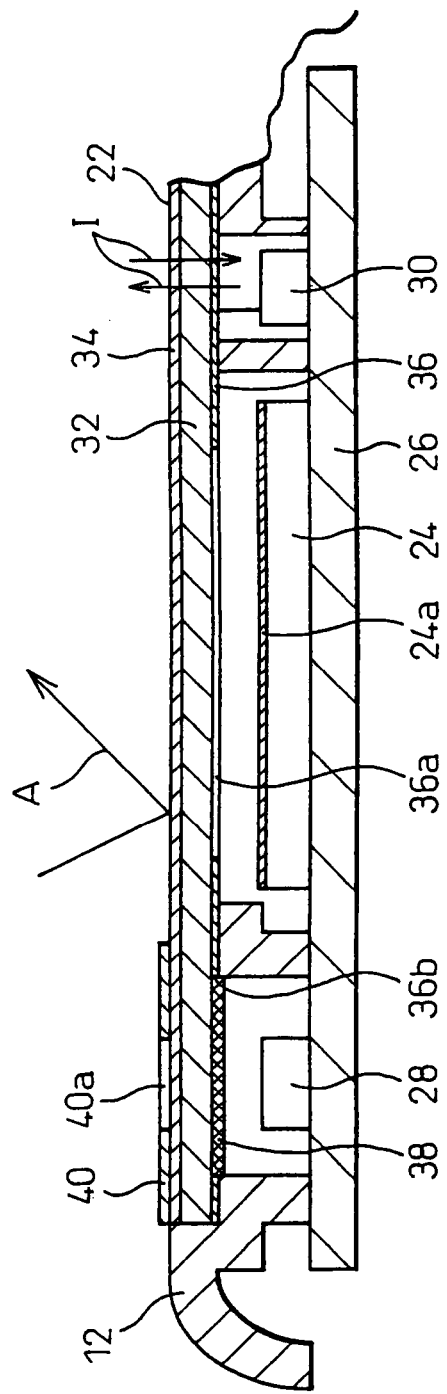
FIG. 6 is a sectional view taken along the line VI-VI in FIG. 4.

FIG. 6 is a sectional view taken along the line VI-VI in FIG. 4. The first casing 12 includes a printed circuit board 26 to which the EL 24 is connected. An LED 28 is arranged in the first casing 12 at a distance from the EL 24 and is connected to the printed circuit board 26. An infrared light communication device 30 is arranged in the first casing 12 on the opposite side of the LED 28 with respect to the EL 24 and is connected to the printed circuit board 26.

Figure 7:
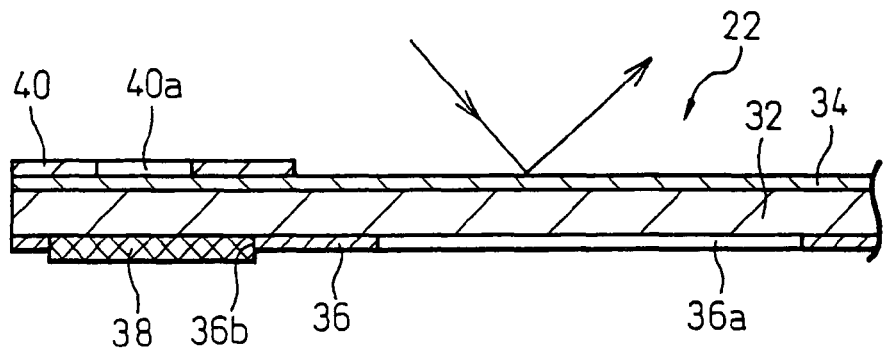
FIG. 7 is a sectional view of the panel.

FIG. 7 is a sectional view of the panel 22. In FIGS. 6 and 7, the panel 22 comprises a transparent plate 32, a half mirror layer 34 provided on the upper surface of the transparent plate 32, and a shading layer 36 provided on the lower surface of the transparent plate 32. The transparent plate 32 is formed by plastic injection molding and has a flat surface or a curved surface. An opening 36 a is provided in the shading layer 36 above the EL 24. The display area 18a is defined by the EL 24. The opening 36a of the shading layer 36 is as large as the EL 24, or is a little smaller than the EL 24. The top surface 24a of the EL 24 is subjected to a blacking treatment (for example, a polarizer is provided).

The shading layer 36 has another opening 36b provided above the LED 28. A diffusion layer 38 is provided at the opening 36b of the shading layer 36. Another shading layer 40 is provided on the half mirror layer 34 to cover the LED 28. The shading layer 40 has a light pervious portion 40a having a predetermined shape. The light pervious portion 40a is an opening corresponding to a removed portion of a printing material when the shading layer 40 is printed or a pervious printing portion provided at such opening. In example shown in FIGS. 4 and 5, the light transmitting portion 40a is formed as a plus (+) shape mark.

The half mirror layer 34 comprises a vapor deposition layer (for example, a multi-layered dielectric layer). A light component having predetermined wavelengths made incident to the half mirror layer 34 is reflected by the half mirror layer 34, and the light component with remaining wavelengths passes through the half mirror layer 34. The shading layer 40 is formed by a black silk printing. The shading layer 40 can be made of any material that can cut off visible light. However, it is preferable that the shading layer 40 be made of a material which permits infrared light to pass through, because an additional infrared filter is not necessary for the infrared light communication device 30. Namely, if the shading layer 40 is provided to cover the infrared light communication device 30, infrared radiation I emitted from the infrared light communication device 30 or made incident to the infrared light communication device 30, can pass through the shading layer 40, however, visible light is intercepted by the shading layer 40, so that no visible light enters the infrared light communication device 30.

Light with predetermined wavelengths made incident from the outside of the first casing 12 to the half mirror layer 34 is reflected by the half mirror layer 34, as shown by the arrow A in FIG. 6. The light with other wavelengths made incident to the half mirror layer 34 passes through the half mirror layer 34 but is absorbed by the shading layer 36. Light which passes through the half mirror layer 34 and the opening 36a of the shading layer 36 is absorbed by the black surface 24a of the EL 24.

Accordingly, most of the light which passes through the half mirror layer 34 is wholly absorbed so that shape of an object cannot be seen by the transmitting light. Thus, a person who sees the outer surface of the panel 22 of the first casing sees reflected light at the half mirror layer 34. Namely, when the EL 24 is not energized, the surface of the panel 22 provided on the outer surface side of the portable phone 10 is seen in a substantially continuously uniform color. This situation is shown in FIG. 4.

When the EL 24 is energized, light emitted by the EL 24 is strong enough to pass through the black portion on the surface 24 of the EL 24 and exit out of the panel 22 via the opening 36 a of the shading layer 36. Namely, when the EL 24 is energized, a display 42 produced by the EL 24 can be seen through the panel 22. This is shown in FIG. 5. The display 42 indicates a pattern of a person's face in FIG. 5, however, the display 42 is not limited to such example. For example, the display 42 can be letters, numbers or other marks. Moreover, the display 42 can be an indication of a telephone call or an indication of a time.

As shown in FIGS. 4 and 5, when the EL (display element) is not used, the surface of the panel 22 provided on the surface of the portable phone is seen in a substantially continuously uniform color as if the second display part 18 does not exist. On the other hand, when the EL (display element) 24 is used, a user can be impressed that the display 42 appears suddenly on the panel surface 22 on which nothing had existed. Therefore, when the display appears on the panel surface 22, a user is given a deeper impression and surprise by the sudden display 42. This display is outstanding in its design, or has appealing features for its user in the point that a display appears suddenly at an empty area. Because a boundary line outlining a display area of the display is not visible, (namely, a display frame of the second display part 18 is invisible,) and only the display can be seen, the above mentioned effect remarkably stands out.

The wavelength characteristics of the light reflected by the half mirror layer 34 can be optionally selected according to a method for forming a vapor evaporation layer. In order for the display 42 to be seen more conspicuously, it is preferable that the wavelength of the reflected light by the half mirror 34 does not overlap with that of the emitted light from the EL 24. Table 1 below shows the relationship between the color and the wavelength of the light reflected by the half mirror layer 34 and those of the light emitted from the EL 24. Visibility is represented by a circular symbol, a triangular symbol and a cross symbol. If 70% or more light passes through the EL 24, the visibility is represented by the circular symbol. The visibility represented by the circular symbol means that a good display 42 can be obtained. In the case of the visibility represented by the triangular symbol, the display 42 can be obtained but there is a possibility that the color may change from an intended color.

TABLE 1

| Item | Panel Dichroic Color and Wavelength nm | | EL Color and Visibility | |
| --- | --- | --- | --- | --- |
| 1 | Violet Red Half mirror: Low | 380 | Blue Green Yellow Orange | ⑧~x ■ ■ ■ |
| 2 | Blue Half mirror: Low | 450 | Blue Green Yellow Orange | ⑧~x ■ ■ ■ |
| 3 | Yellow Half mirror: High | 550 | Blue Green Yellow Orange | ■ ⑧~x ⑧~x ■ |
| 4 | Orange Half mirror: High | 650 | Blue Green Yellow Orange | ■ ■ ■ ⑧~x |

The reflectance of the half mirror layer 34 is maximum at the incident angle of approximately 45° to the half mirror layer 34. Therefore, the reflectance when the portable phone 10 is seen from the front is higher than that when it is viewed from the lateral side. Accordingly, if a person other than the user looks at the portable phone 10, the display 42 is hard to see because he/she sees strong reflected light, and therefore, information is not revealed to a person other than the user.

When the LED 28 is energized, light emitted from LED 28 passes through the diffusion layer 38 provided at the opening 36 of the shading layer 36, and exits to the outside of the panel 22 through the light pervious portion 40a of the shading layer 40. If the light pervious portion 40a of the shading layer 40 is formed in the plus (+) shape, a plus (+) shaped mark is irradiated by light so that the user sees such mark.

The light, which passes through the diffusion layer 38, not only moves in the direction perpendicular to the panel 22 and irradiates the light pervious portion 40a of the shading layer 40, as mentioned above, but also a part of the light moves in the slanting direction with respect to the panel 22 and collides against the shading layer 40. Light which collides against the shading layer 40 is reflected by the shading layer 40, further reflected by the shading layer 36 and reaches the region around the shading layer 40 to irradiate the region surrounding the shading layer 40. The region 44 around the shading layer 40 irradiated in this manner is shown in FIG. 5.

In this way, illumination effect is improved, since the plus (+) shaped mark corresponding to the light pervious portion 40a of the shading layer 40 is illuminated and the region 44 around the shading layer 40 is illuminated. The illumination of the region 44 around the shading layer 40 is useful particularly when the portable phone 10 is used in a dark place.

It is preferable that the wavelength of the reflected light by the half mirror 34 is shifted from that of the emitted light from the LED 28. Table 2 below shows the relationship between the color and central wavelength of light reflected by the half mirror layer 34 and those of the, identically light emitted from the LED 28. Visibility is represented same to Table 1, by a circular symbol, a triangular symbol and a cross symbol. In this case, the colors of the plus (+) shaped mark and of the illumination of the region 44 of the shading layer 40 can be deliberately changed according to the relationship between wavelength of the emitted light from the LED 28 and that of the light reflected by the half mirror layer 34.

TABLE 2

| Item | Panel Dichroic Color and Wavelength nm | | LED emitting color and Visibility | |
|---|---|---|---|---|
| 1 | Violet Red | 380 | Blue | ⊗~x |
|  | Half mirror: |  | Green | ■ |
|  | Low |  | Red | ■ |
| 2 | Blue | 450 | Blue | ⊗~x |
|  | Half mirror: |  | Green | ■ |
|  | Low |  | Red | ■ |
| 3 | Yellow | 550 | Blue | ■ |
|  | Half mirror: |  | Green | ⊗~x |
|  | High |  | Red | ■ |
| 4 | Orange | 650 | Blue | ■ |
|  | Half mirror: |  | Green | ■ |
|  | High |  | Red | ⊗~x |

Figure 8:
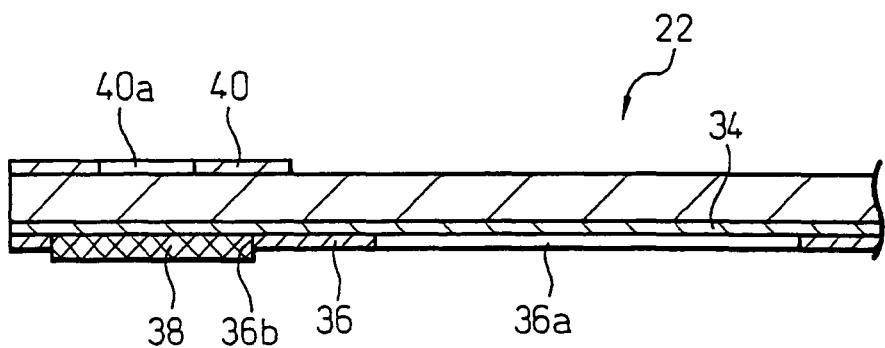
FIG. 8 is a sectional view of a modified example of the panel of FIG. 7.

FIG. 8 is a sectional view showing a modified example of the panel 22 of FIG. 7. The basic structure of the panel 22 of FIG. 8 is similar to the basic structure of the panel 22 of FIG. 7. However, in FIG. 8, the half mirror layer 34 is provided on the lower surface of the transparent plate 32, and the shading layer 36 is provided on the lower surface of the half mirror layer 34. The mode of operation in the modified example is the same as that mentioned above explained.

Figure 9:
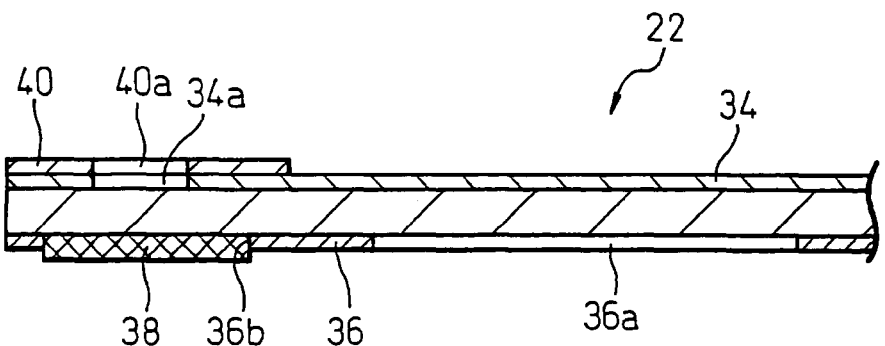
FIG. 9 is a sectional view of a modified example of the panel of FIG. 7.

FIG. 9 is a sectional view of a modified example of the panel 22 of FIG. 8. The basic structure of the panel 22 of FIG. 9 is similar to the basic structure of the panel 22 of FIG. 7. However, in FIG. 9, the half mirror layer 34 has an opening 34a corresponding to the light pervious portion 40a of the shading layer 40. The mode of operation in the modified example is the same as that mentioned above explained.

As explained above, according to the present invention, an electronic device having a unique feature in appearance can be obtained. In particular, if the present invention is applied to a display element of a foldable portable phone formed on a surface opposite to a surface on which a switch key is formed, required information can be obtained even in a closed state.

The invention claimed is:

1. An electronic device, comprising:
a casing;
an electronic component disposed within the casing;
a first display element disposed within the casing; and
a cover covering at least a portion of the casing where the first display element and the electronic component as a second display element are disposed therein, wherein a half mirror layer is formed on an outer surface of the cover, and the half mirror layer reflects light having a predetermined wavelength and transmits light having a wavelength other than the predetermined wavelength, a shading layer is formed on an inner surface of the cover that is opposite the half mirror portion, and a first opening and a second opening are formed in portions of the shading layer where the first display element and the second display element are disposed thereunder, respectively, and a diffusion layer is formed on the second opening.

2. The electronic device according to claim 1, wherein:
a panel is disposed on the first display element, wherein the panel is configured to absorb light entered into the electronic device through the cover.

3. The electronic device according to claim 1, wherein:
a wavelength of light that is reflected by the half mirror layer is different from a wavelength of light that is emitted from the first display element.

* * * * *